UNITED STATES PATENT OFFICE.

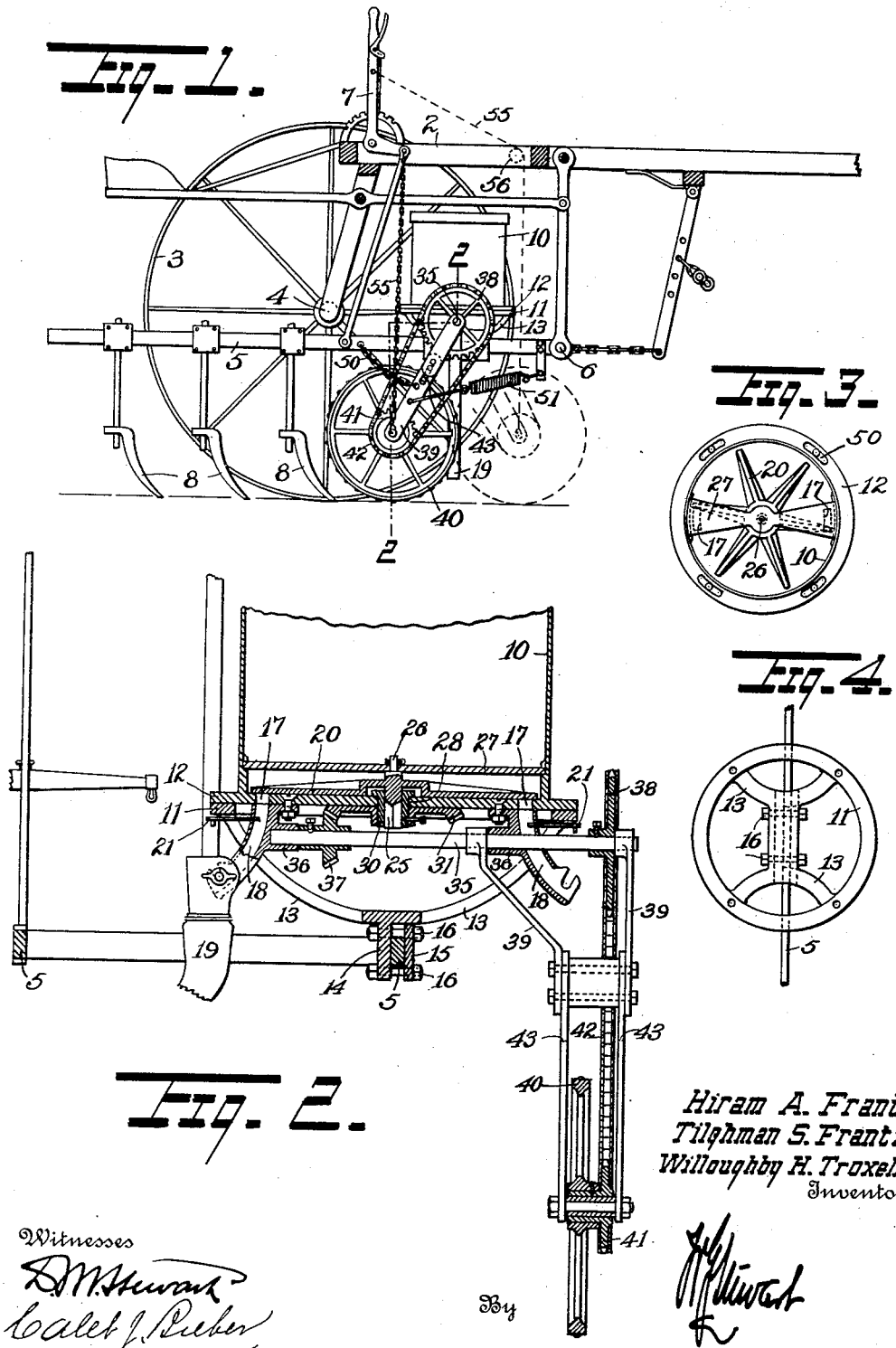

HIRAM A. FRANTZ, OF CHERRYVILLE, AND TILGHMAN S. FRANTZ AND WILLOUGHBY H. TROXELL, OF NEAR COPLAY, PENNSYLVANIA, ASSIGNORS TO KEYSTONE ATTACHMENT CO., OF CHERRYVILLE, PENNSYLVANIA, A COPARTNERSHIP COMPOSED OF HIRAM A. FRANTZ, TILGHMAN S. FRANTZ, AND WILLOUGHBY H. TROXELL.

FERTILIZER ATTACHMENT TO CULTIVATORS.

1,053,944.  Specification of Letters Patent.  Patented Feb. 18, 1913.

Application filed June 24, 1912. Serial No. 705,374.

*To all whom it may concern:*

Be it known that we, HIRAM A. FRANTZ, TILGHMAN S. FRANTZ, and WILLOUGHBY H. TROXELL, all citizens of the United States, and residents, respectively, of Cherryville, Northampton county, and near Coplay, Lehigh county, all in the State of Pennsylvania, have invented certain new and useful Improvements in Fertilizer Attachments to Cultivators, of which the following is a specification.

Our invention relates to an improved fertilizer attachment for cultivators, in which the hopper feed mechanism is adapted to be operated by an independent trailing drive wheel therefor, as fully described in connection with the accompanying drawings, the novel features being specifically pointed out in the claims.

Figure 1 is a side elevation showing our improved mechanism as applied to a cultivator of known construction, the latter being sufficiently indicated to illustrate the application of the invention. Fig. 2 is an enlarged cross-sectional view of the hopper mechanism, taken on the line 2—2 of Fig. 1. Fig. 3 is a separate plan view of the hopper and Fig. 4 is a similar view of the supporting bracket therefor.

The drawing indicates the traction frame 2 of a riding cultivator having traction wheels 3 mounted on axle bars 4, and a pair of approximately parallel longitudinal gang beams 5 pivotally connected thereto at 6 so as to permit of their being raised or lowered as desired by means of suitable levers 7.

Our improved fertilizer mechanism is shown as applied to one of the gang beams 5, the hopper 10 thereof being mounted on said beam forward of the shares 8 and rearward of the pivotal point 6.

The carrier bracket for the hopper 10, as shown, comprises a ring 11 to which the bottom 12 of the cylindrical hopper is bolted, and depending arms 13 which carry a rigid clamping plate 14 adapted to be adjustably secured to the beam 5 by means of a separate clamping plate 15 and suitable clamping bolts 16. The hopper bottom is provided with diagonally opposite outlet openings 17 each of which communicates with a discharge spout 18 to which delivery extensions 19 may be adjustably attached as indicated. The material is agitated and fed to the openings 17 by means of a rotary feed spider 20, and the discharge area of the spouts is regulated as desired by suitably adjusted valve plates 21, the general construction indicated being similar to that shown and described in Patent No. 978,363, issued December 13th, 1910, to Tilghman S. Frantz and Willoughby H. Troxell. The feed spider 20 is provided with a central angular stud 25 having an upward bearing-extension 26, which latter is centrally journaled in a fixed cover plate 27 spaced above the bottom of the hopper and arranged to overlie the hopper openings 17 and the rotating feed spider. The angular stud 25 of the spider is loosely fitted in an angular opening of a hub-bushing 30 of a gear wheel 31, the upward extension of which bushing is supported and journaled in the hopper bottom opening 28.

The feed spider is rotated by an operating shaft 35, which is mounted below the hopper bottom in bearings 36, 36 formed on the spouts 18 as shown; said shaft having fixed to it a pinion wheel 37 arranged in mesh with the gear wheel 31, and being also provided, at its outer end, as indicated, with a sprocket wheel 38 to which the driving power is applied.

The drive mechanism for the feed spider is pivotally suspended from the operating shaft 35; the frame plates 39, 39, being pivotally mounted at their upper ends upon said shaft, and carrying between their lower ends a trailing drive wheel 40 to which rotary motion is given by contact with the ground, and a connected sprocket wheel 41 engaging a drive chain 42. This suspended drive mechanism may be normally swung either rearward of the vertical as shown, or forward of the vertical as indicated in dotted lines, when the drive wheel is in operative contact with the ground; the position shown being ordinarily preferred, but the dotted position permitting of the drive wheel being farther away from the shares when desired. In either case the swing of the frame is controlled, as indicated, by a connecting chain 50 which positively limits it in one direction, and by a connecting spring 51 which exerts a yielding pull in the other direction so as to insure proper operating contact with the ground; these connections being obviously reversed from that shown, when the trailing wheel is moved to the dotted position. To provide for setting the trailing drive wheel 40 to satisfactorily operative position in each case, the bolt openings provided in the hopper bottom 12 for securing the hopper to the bracket ring 11 are made in the form of circular slots as indicated at 50, 50, Fig. 3, thereby permitting of rotary adjustment of the hopper as may be required.

The operation of the lever 7 to raise the gang beams 5 to inoperative position, is arranged to also effect the direct raising of the swinging frame 39; this being accomplished through the medium of a connection 55, as shown, between said lever and frame, which connection is guided upon an idler roller 56 when the drive wheel is in the operating position indicated in dotted lines. The frame bars 39 are shown as made up of two parts bolted together intermediately of their length and provided with slots 43 for vertical adjustment of their length.

What we claim is:—

1. In combination with a cultivator comprising a wheeled traction frame and a pivotally carried gang beam; a fertilizer mechanism comprising a carrier bracket secured to said beam, a hopper secured to said bracket and provided with discharge spouts, a rotary feed-spider in said hopper, an operating shaft for said spider carried by said hopper, and a suspended frame pivotally carried by said shaft and provided with a trailing drive-wheel therefor.

2. In combination with a cultivator comprising a wheeled traction frame and a pivotally carried gang beam; a fertilizer mechanism comprising a carrier bracket secured to said beam, a hopper secured to said bracket and provided with discharge spouts, a rotary feed-spider and an operating shaft in gear with said spider, a suspended frame pivotally carried by said shaft and provided with a trailing drive-wheel therefor, and a spring-embracing means for controlling the swing of said suspended frame.

3. In combination with a cultivator comprising a wheeled traction frame and a pivotally carried gang beam; a fertilizer mechanism comprising a carrier bracket secured to said beam, a hopper secured to said bracket and provided with discharge spouts, a rotary feed-spider and an operating shaft in gear with said spider, a suspended frame pivotally carried by said shaft and provided with a trailing drive-wheel therefor, and a lever mechanism for raising said frame to inoperative position.

4. In combination with a cultivator comprising a wheeled traction frame and a pivotally carried gang beam; a fertilizer mechanism comprising a carrier bracket secured to said beam, a hopper secured to said bracket and provided with discharge spouts, a rotary feed-spider and an operating shaft in gear with said spider, a suspended frame pivotally carried by said shaft and provided with a trailing drive wheel therefor, a spring-embracing means for controlling the swing of said suspended frame and a lever mechanism for raising the same to inoperative position.

5. In combination with a cultivator comprising a wheeled traction frame and a pivotally carried gang beam; a fertilizer mechanism comprising a carrier bracket secured to said beam, a hopper secured to said bracket and provided with discharge spouts, a rotary feed-spider and an operating shaft in gear with said spider, a suspended frame pivotally carried by said shaft and provided with a trailing drive-wheel therefor, and a single-lever mechanism arranged to simultaneously raise said gang beam and suspended frame to inoperative position.

6. In combination with a cultivator comprising a wheeled traction frame and a pivotally carried gang beam; a fertilizer mechanism comprising a carrier bracket secured to said beam, a hopper secured to said bracket and provided with a fixed bottom having discharge spouts and a central opening and a fixed bearing and cover plate spaced above said bottom, an interposed rotary feed spider journaled in said bearing plate having a depending angular stud, a hollow hubbed bevel gear wheel journaled in said hopper opening and engaging said angular stud, an operating shaft having a pinion wheel in mesh with said gear wheel, and a trailing drive-wheel mechanism suspended from said operating shaft, substantially as set forth.

7. In combination with a cultivator comprising a wheeled traction frame and a pivotally carried gang beam; a fertilizer mechanism comprising a carrier bracket secured to said beam, a hopper secured to said bracket and provided with discharge spouts, a rotary feed-spider in said hopper, an operating shaft for said spider carried by said hopper, and a suspended frame pivotally carried by said shaft and provided with a trailing drive-wheel therefor; said hopper being adjustable upon said bracket substantially as and for the purpose set forth.

In testimony whereof, we affix our signatures, in the presence of two witnesses.

HIRAM A. FRANTZ.
TILGHMAN S. FRANTZ.
WILLOUGHBY H. TROXELL.

Witnesses:
JOSEPH P. FRY,
F. H. MARSH.

Copies of this patent may be obtained for five cents each, by addressing the "Commissioner of Patents, Washington, D. C."